(12) United States Patent
Furuya et al.

(10) Patent No.: US 6,280,170 B1
(45) Date of Patent: Aug. 28, 2001

(54) HYDRAULIC CONTROL SYSTEM FOR AN INJECTION MOLDING MACHINE

(75) Inventors: Masahiko Furuya, Shimizu-cho; Hiroki Arakawa, Nagoya, both of (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/372,033

(22) Filed: Aug. 11, 1999

(30) Foreign Application Priority Data

Aug. 11, 1998 (JP) .................................................. 10-239577

(51) Int. Cl.⁷ .................................................. B29C 45/82
(52) U.S. Cl. ............................................ 425/145; 425/150
(58) Field of Search ...................................... 425/145, 150

(56) References Cited

U.S. PATENT DOCUMENTS

| 4,712,991 | * | 12/1987 | Hehl | 425/145 |
| 4,755,123 | * | 7/1988 | Otake | 425/145 |
| 4,889,478 | * | 12/1989 | Sato | 425/150 |
| 5,494,427 | * | 2/1996 | Arai | 425/145 |

* cited by examiner

Primary Examiner—Tim Heitbrink
(74) Attorney, Agent, or Firm—Pillsbury Winthrop LLP

(57) ABSTRACT

A hydraulic control system for an injection molding machine is provided with a pump driving induction motor capable of operating at an operating speed corresponding to a flow rate at which a hydraulic fluid is to be supplied to a desired one of hydraulic actuators for operating the functional components of the injection molding machine to supply the hydraulic fluid efficiently at a reduced power consumption. Since the operating speed of the induction motor is controlled according to the desired flow rate of the hydraulic fluid corresponding to the operating speed of the hydraulic actuator, the hydraulic fluid can efficiently be supplied to the hydraulic actuator and the useless power consumption can be avoided.

8 Claims, 5 Drawing Sheets

HYDRAULIC CONTROL SYSTEM FOR AN INJECTION MOLDING MACHINE

BACKGROUND OF THE INVENTION

1. Field of the Invention

The present invention relates to a hydraulic control system for an injection molding machine, particularly to a hydraulic control system including a driving motor for a fixed delivery pump which is capable of supplying a hydraulic fluid at a rate corresponding to the driving speed of an hydraulic actuator included in the injection molding machine, and reducing a power consumption.

2. Description of the Related Art

FIG. 4 shows a conventional hydraulic control system for an infection molding machine. A fixed delivery pump 1, which is driven by an induction motor 2, draws the hydraulic fluid from a reservoir 3 and delivers it through a proportional flow control valve 4 to actuators included in the injection molding machine. The actuators are ones such as a clamping cylinder 5, an injection cylinder 7 for driving a screw 6 to move forward and backward and a charging hydraulic motor 8 for driving the screw 6 for rotation. A solenoid valve 9 is operated to control the claimping cylinder 5 for a closing and opening operation for the mold. A solenoid valve 10 is operated to control the injection cylinder 7, which advances the screw 6 for an injection operation and to retract the screw 6 for a charging operation. A flow control valve 11 regulates a hydraulic fluid supplied to the charging hydraulic motor 8. A solenoid valve 12 is closed to suspend the supply of the hydraulic fluid to the hydraulic motor 8. The hydraulic pressure in the hydraulic system is determined by a pressure relief valve 13 as desired. The proportional flow control valve 4 controlls the flow of the hydraulic fluid on the basis of an electric signal S given thereto by a main controller 14 for the injection molding machine so as to supply the hydraulic fluid at a flow rate necessary for driving each of the actuators at a desired speed.

The operation of the conventional hydraulic control system will be described hereinafter.

When clamping the mold in a clamping process, the proportional flow control valve 4 regulates the hydraulic fluid discharged from the fixed delivery pump 1 to flow through the solenoid valve 9 to the clamping cylinder 5 at a low flow rate which is predetermined by the controller 14. Initially, a movable platen, not shown, starts closing the mold at a low speed. Then, the proportional flow control valve 4 is controlled so as to supply the hydraulic fluid at a predetermined high flow rate to the mold clamping cylinder 5. In a final stage of the mold clamping operation, the hydraulic fluid is regulated to a predetermined low flow rate to close the mold gradually. After the mold has been fully closed, the hydraulic pressure in the clamping cylinder 5 is maintained to keep the mold clamped by a clamping force.

In a subsequent injection process, when the hydraulic fluid is supplied at a high flow rate to the injection cylinder 7, the screw 6 advances to inject a quantity of a molten polymer charged in front of the screw 6 into a cavity in the mold. After the injection process has been completed, a dwelling process is executed to prevent against a defect such as a sinkmark that occurs in a cooled polymer in the mold. In the dwelling process, the hydraulic pressure in the injection cylinder 7 is maintained until the polymer in the mold is cooled and solidified.

A mold opening process is started after the polymer in the mold has fully solidified. The movable platen is moved at a low speed during an initial stage and a final stage, but increased its moving speed during midway of a stroke of the mold opening. Finally, a molded part is ejected from the mold to complete the mold opening process.

In the mean time, the injection barrel is retracted from the mold, the screw 6 is rotated to charge the molten polymer for the next injection molding cycle. After a predetermined quantity of molten polymer is charged, the screw 6 is moved slightly backward for a melt decompression to prevent the molten polymer from drooling out of a nozzle attached to the injection barrel. Thus, one injection molding cycle is completed.

FIG. 5 shows another example of a conventional hydraulic control system for an injection molding machine. This hydraulic control system is provided with a large-capacity fixed delivery pump 17 and a small-capacity fixed delivery pump 18 with pressure relief valves 15 and 16, respectively, instead of the fixed delivery pump 1 as shown in FIG. 4. A solenoid valve 19 is controlled properly according to a desired flow rate. For example, when the clamping cylinder 5 is driven at a high speed, the solenoid valve 19 is opened so as to supply the hydraulic fluid with the clamping cylinder 5 from the both fixed delivery pump 17 and 18.

In the hydraulic control system shown in FIG. 4, the fixed delivery pump 1 is running so as to discharge continuously the hydraulic fluid at a maximum flow rate necessary to advance the screw 6. That leads to a power loss. For example, in the dwelling and cooling process in which a low flow rate should be supplied with the injection cylinder 7, surplus hydraulic fluid is returned through the pressure relief valve 13 into the reservoir 3. Thus, the fixed delivery pump 1, which is loaded continuously at the pressure set by the pressure relief valve 13, wastes a lot of power uselessly.

In the hydraulic control system shown in FIG. 5, a large flow of the hydraulic fluid is supplied with the clamping cylinder 5 through solenoid valve 19 by combining the delivery of pump 17 and 18. In a case that a small hydraulic flow should be delivered, the solenoid valve 19 is closed, and hydraulic fluid is delivered by the pump 18 with small capacity. However, the large capacity pump 17 is running continuously while the surplus hydraulic fluid is bent through the pressure relief valve 15. That is undesirable from the viewpoint of energy economy.

SUMMARY OF THE INVENTION

Accordingly, it is an object of the present invention to provide a hydraulic system for an injection molding machine, capable of operating at a low power consumption and of preventing wasting power, and including a pump driving motor for driving an oil pump to supply a hydraulic oil efficiently at a flow rate corresponding to the operating speed of a hydraulic actuator.

According to one aspect of the present invention, a hydraulic control system for an injection molding machine comprises a plurality of hydraulic actuators assigned respectively for driving functional units included in the injection molding machine; an hydraulic pump for supplying a hydraulic fluid to drive the hydraulic actuators; a pump driving motor for driving the hydraulic pump; a hydraulic circuit including solenoid valves for serving to direct the hydraulic fluid to the optional hydraulic actuators to drive the hydraulic actuators selectively; a controller that provides flow control signals for instructing flow rates corresponding to predetermined operating speeds at which the hydraulic actuators is driven according to respective stages of an injection molding cycle; a speed control valve, disposed in the hydraulic circuit at a position downstrean of the hydraulic pump, for controlling the flow rate of the hydraulic fluid to be supplied to the hydraulic actuators on the basis of the flow control signals; a motor controller using an inverter to control the pump driving motor for rotation at a desired rotational speed; and a pump speed setting means, connected between the controller and the motor controller, for determining rotational speeds of the hydraulic pump on the basis of the flow control signals provided by the controller.

The hydraulic control system of the present invention controls the pump driving motor for operation at operating speeds necessary for supplying the hydraulic fluid at flow rates respectively corresponding to the operating speeds of the hydraulic actuators, so that the hydraulic fluid can efficiently be supplied to the hydraulic actuators, the useless operation of the motor can be avoided to save power consumption.

The flow control signals to be given to the motor controller may include a motor stop signal to stop the pump driving motor, and the pump driving motor may be stopped while the hydraulic pump need not operate.

A desired operation may be started after the motor stop signal has been given to the motor controller by a signal provided at predetermined time precedent to the start of the desired process to compensate a delay in the response of the flow control valve.

The operation of the pump driving motor may be controlled in a sequence control mode by the motor controller according to selected process of the injection molding cycle.

BRIEF DESCRIPTION OF THE DRAWING

An embodiment of the present invention will now be described with reference to the accompanying drawing, in which.

DESCRIPTION OF THE PREFERRED EMBODIMENTS

Figure 3:
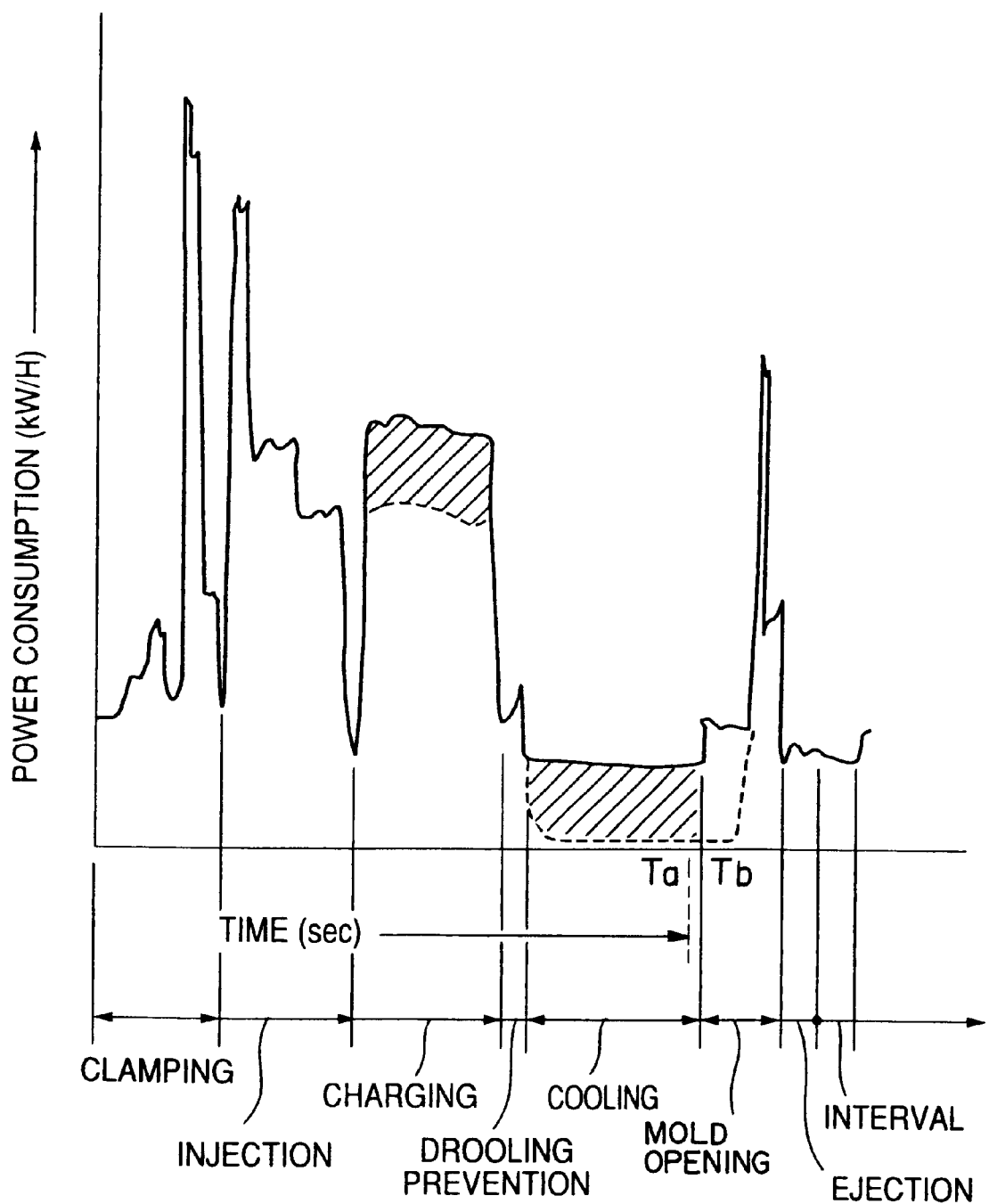
FIG. 3 shows a graph comparing present invention and prior art in a viewpoint of power consumption.
Figure 4:
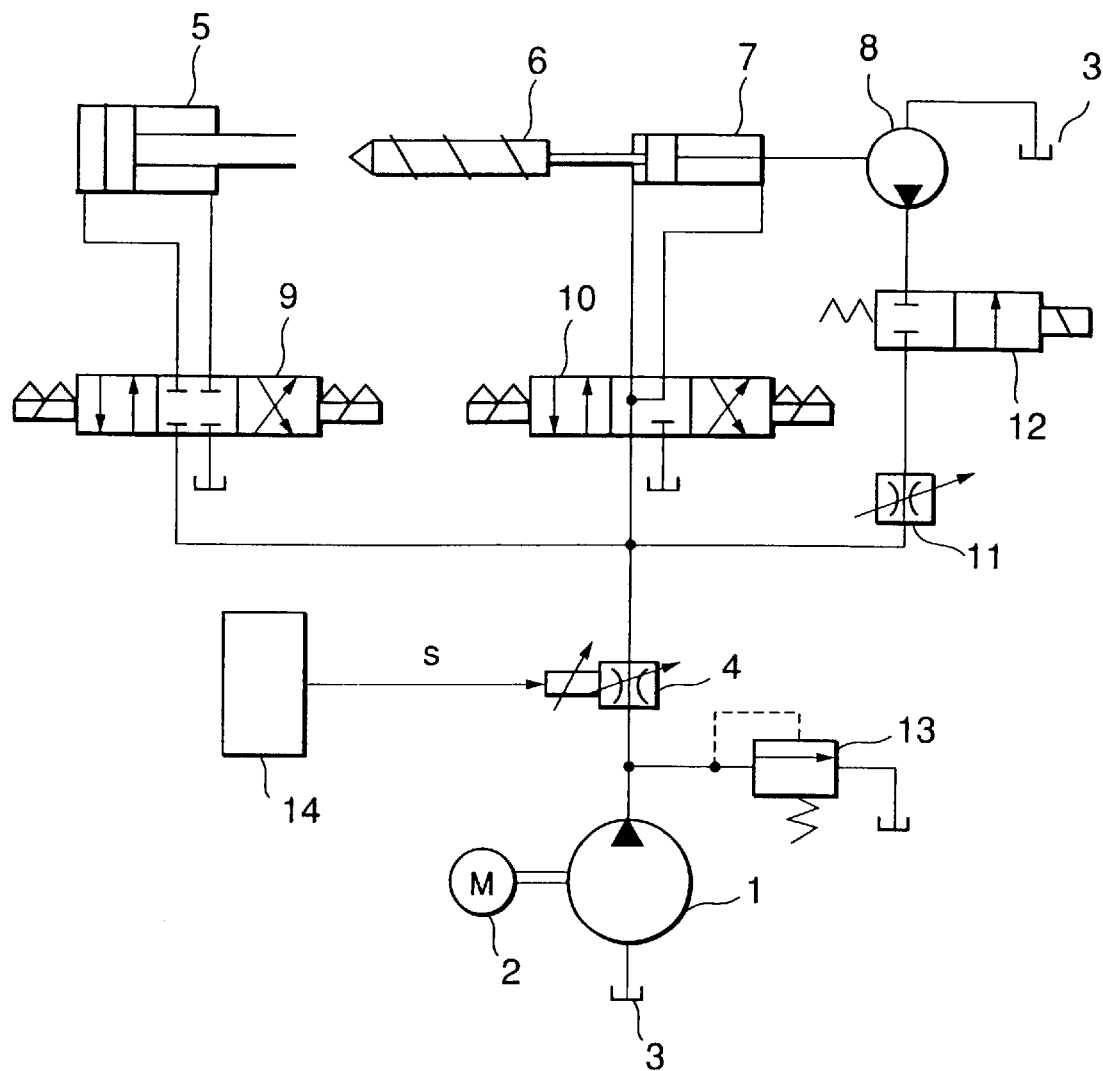
FIG. 4 shows a schematic diagram of a conventional hydraulic control system for an injection molding machine.
Figure 5:
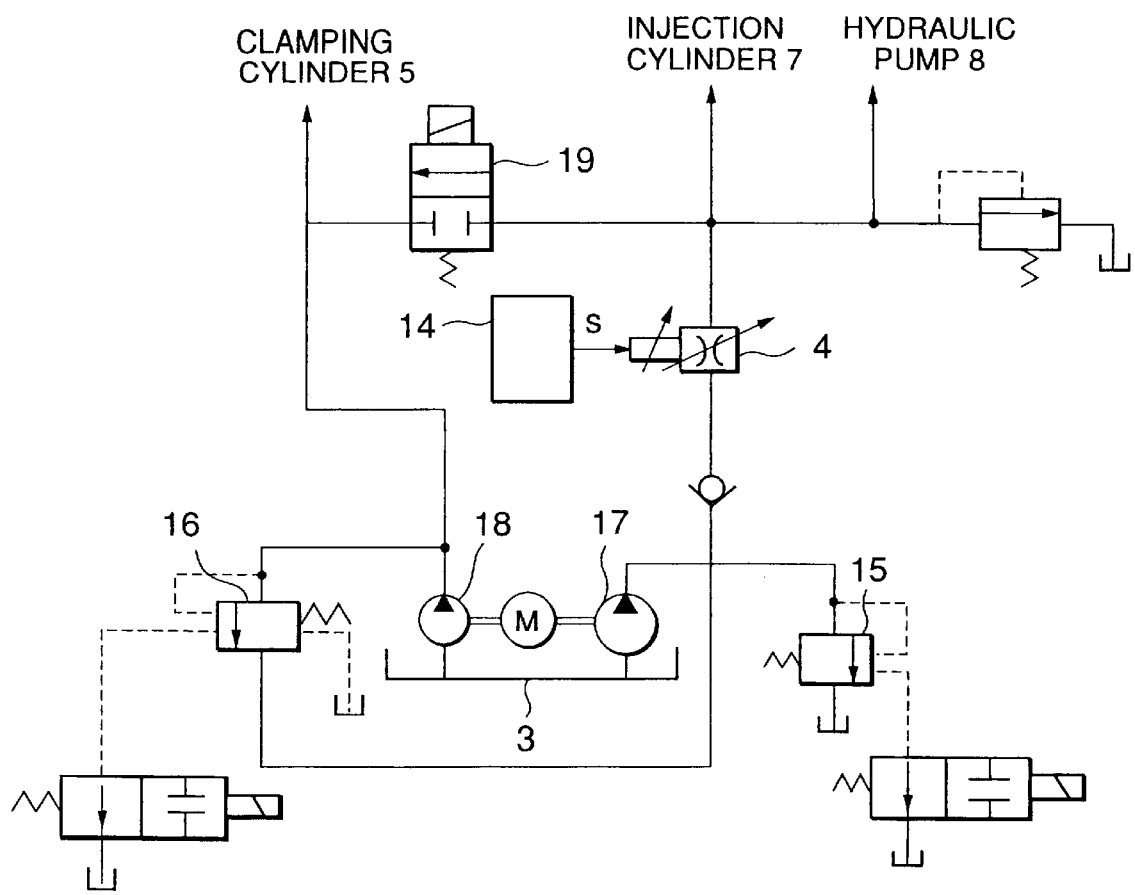
FIG. 5 shows a schematic diagram of a another conventional hydraulic control system for an injection molding machine.

A hydraulic control system in a preferred embodiment according to the present invention will be described with reference to FIGS. 1 to 3, in which parts like or corresponding to those of the conventional hydraulic control systems previously described with reference to FIGS. 4 and 5 are designated by the same reference characters and the description thereof will be omitted. The hydraulic control system of the present invention differs from the conventional hydraulic systems in a pump driving motor and a control system thereof.

Figure 1:
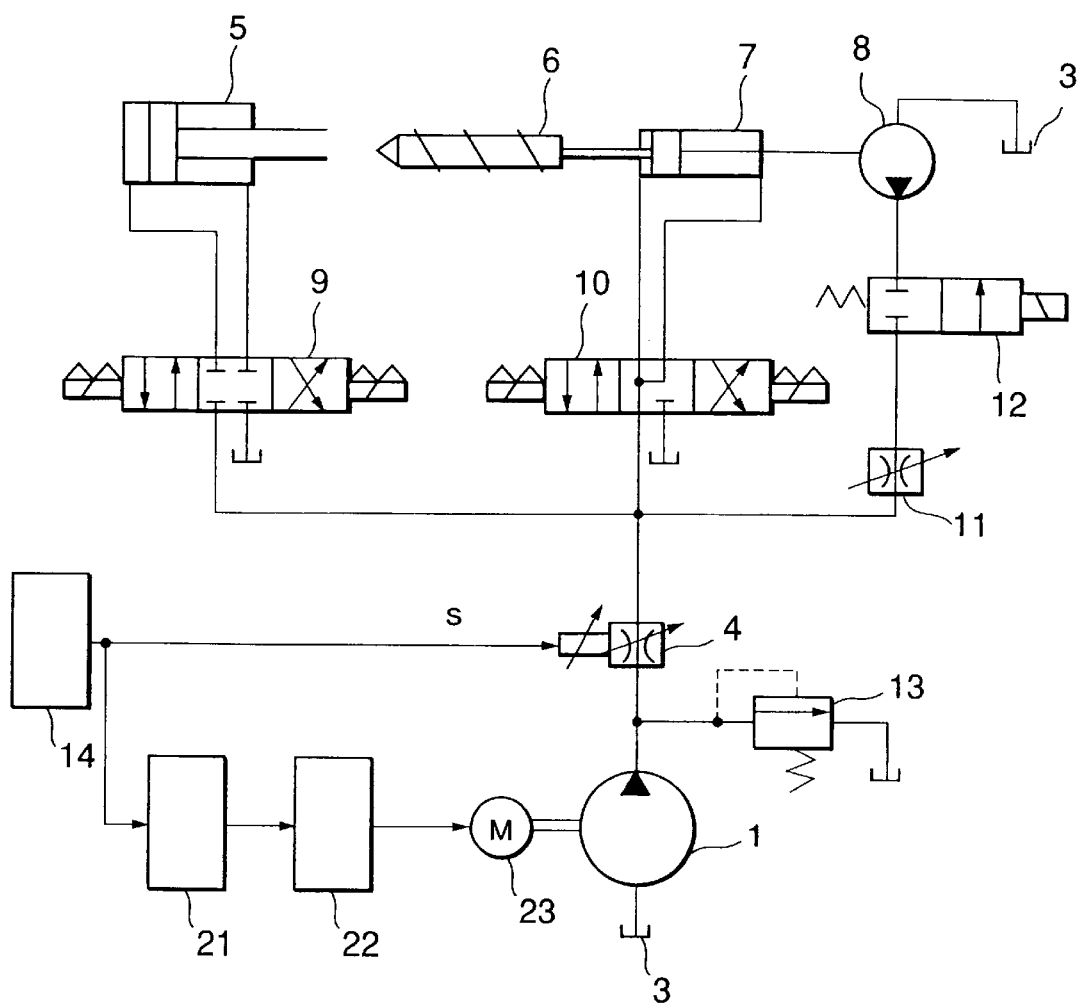
FIG. 1 shows a schematic diagram of a hydraulic control system according to the present invention.
Figures 2A, 2B:
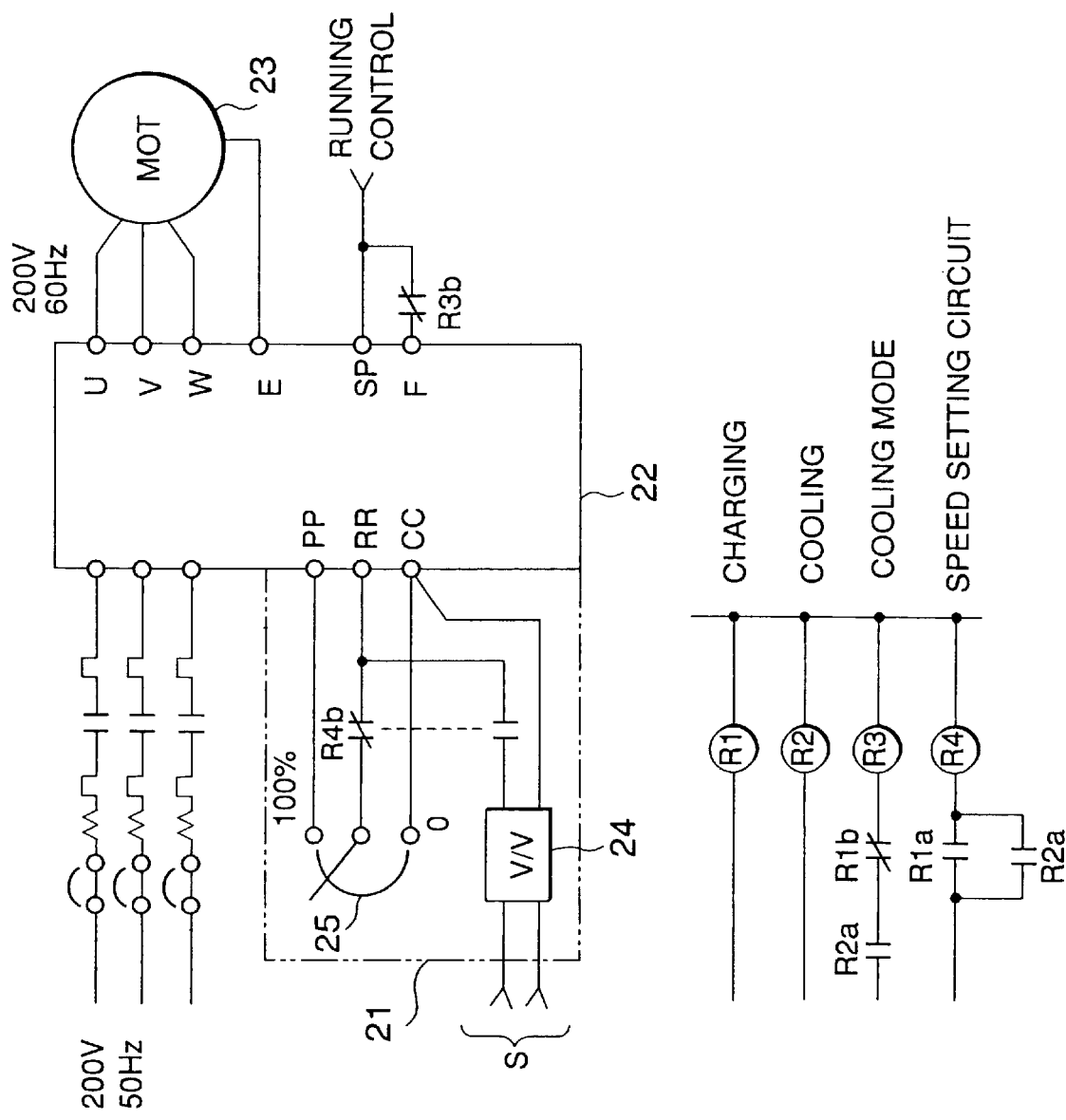
FIGS. 2A and 2B show a schematic diagram of voltage setting circuit involved in the hydraulic control system according to the present invention.

Referring to FIGS. 1 and 2A and 2B, a main controller 14 for controlling an injection molding machine gives an electric signal S which instructs a flow rate to a proportional flow control valve 4. The signal S is also fed into a signal converter 21. The signal converter 21 is connected between the main controller 14 and a inverter controller 22 provided with a transformer 24 for converting the electric signal S into a corresponding control voltage for controlling the inverter controller 22. The inverter controller 22 controls the rotational speed of a pump driving induction motor 23 which drives the fixed delivery pump 1. Accordingly, the rotational speed of the induction motor 23 is regulated according to the voltage of the electric signal S provided by the main controller 14 so that the induction motor 23 operates at an rotational speed corresponding to a predetermined flow rate at which the hydraulic fluid is to flow through the proportional flow control valve 4.

Also, the signal converter 21 is provided with a voltage setting circuit 25 for applying a voltage in a range of 0 to 100% of the maximum output of the inverter controller 22. The induction motor 23 stops when a voltage equal to 0% of the maximum voltage is applied to the inverter controller 22. The induction motor 23 operates at a maximum rotational speed when a voltage equal to 100% of the maximum voltage is applied to the inverter controller 22.

Since the induction motor 23 operates at an desired rotational speed corresponding to the required flow rate of the hydraulic fluid, the fixed delivery pump 1 delivers the necessary hydraulic fluid, power is not consumed uselessly.

The operation of the hydraulic system in a cooling process and a charging process included in one injection molding cycle will be described hereinafter with reference to FIGS. 1 and 2.

Upon the completion of injecting a molten polymer into the mold, a charging process for the next injection molding cycle is started. In the charging process, a charging relay R1 is actuated so that a screw 6 is driven for rotation by a hydraulic motor 8. Then, an A contact R1a included in the voltage setting circuit 25 closes to actuate a relay R4. A B contact R4b included in the voltage setting circuit 25 opens so that a voltage set by the voltage setting circuit 25 dose not apply to the induction motor 23 during the charging process. As a result, an output voltage provided by the transformer 24 is applied to the inverter controller 22. Consequently, the induction motor 23 operates at an rotational speed capable of driving the fixed delivery pump 1 so that the hydraulic fluid flows through the proportional flow control valve 4 at a flow rate sufficient to drive the hydraulic motor 8 at a predetermined speed.

Upon the completion of the charging process, the charging relay R1 is opened. After retreating the screw 6 slightly, a cooling process is started.

In the cooling process, a cooling relay R2 is actuated to close an A contact R2a in the voltage setting circuit 25, and the relay R4 is actuated to open the B contact R4b opens so that a voltage set by the voltage setting circuit 25 dose not apply to the induction motor 23. However, since the A contact R2a of a cooling relay R2 is closed and the charging relay R1 is unactuated, a cooling mode relay R3 is actuated to open a B contact R3b included in a circuit for controlling the induction motor 23 so that the induction motor 23 is stropped. Consequently, power consumption by the induction motor 23 is reduced to naught.

When the induction motor 23, which is stopped during the cooling process, restarts to proceed with the mold opening process, there is a delay before the flow rate through the proportional flow control valve 4 reaches to the set value. To eliminate the disadvantage, the main controller 14 is provided with a timer for timing signal generation to compensate the delay in response of the proportional flow control valve 4. As shown in FIG. 3, the main controller 14 provides the signal S to the induction motor 23 to start at a time Ta precedent to a predetermined resuming time Tb of the mold opening process. When the time reaches at the resuming time Tb, the main controller 14 provides the signal S to the proportional flow control valve 4.

Control operations similar to those controlled by the inverter for the cooling process and the charging process may be carried out in other processes including an injection process in which sequential control operations are executed to vary the flow rate of the hydraulic oil in a wide range.

FIG. 3 shows measured values of power consumption obtained by the experimental operation of an injection molding machine provided with the conventional hydraulic system (continuous lines) and an injection molding machine provided with the hydraulic system of the present invention (broken lines). The power consumption in one injection molding cycle of the injection molding machine provided with the hydraulic system of the present invention was 17.0 kWH, whereas that of the injection molding machine provided with the conventional hydraulic system was 24.5 kwH. The present invention reduced the power consumption about 30%. In the hydraulic system of the present invention, the pump driving motor was stopped in the cooling process and hence noise was not generated in the cooling process.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A hydraulic control system for an injection molding machine, comprising:

a plurality of hydraulic actuators assigned respectively for driving functional units included in the injection molding machine;

a hydraulic circuit including solenoid valves for serving to direct the hydraulic fluid to the optional hydraulic actuators to drive the hydraulic actuators selectively;

a controller that provides flow control signals for instructing flow rates corresponding to predetermined operating speeds at which the hydraulic actuators are driven according to respective stages of an injection molding cycle;

a speed control valve, disposed in the hydraulic circuit at a position downstream of the hydraulic fluid to be supplied to the hydraulic actuators on the basis of the flow control signals;

a motor controller using an inverter to control the pump driving motor for rotation at a desired rotational speed; and a pump speed setting means, connected between the controller and the motor controller, for determining a rotational speed instruction given to the motor controller on the basis of the flow control signals provided by the controller.

2. The hydraulic system according to claim 1, wherein the pump speed setting means comprises:

a first speed setting means for preparing beforehand a desired rotational speed of the pump driving motor;

a second speed setting means for converting the flow control signal into a motor speed signal corresponding to a flow rate at which the hydraulic oil is to flow through the speed control valve and giving the motor speed signal to the motor controller; and a switching means for selecting either the first or the second setting means for use.

3. The hydraulic system according to claim 2, wherein the switching means comprises a sequential control relays that makes either the first or the second speed setting means effective, when an operation for a process of the injection molding cycle is selected, in accordance to a procedure determined beforehand for the process.

4. The hydraulic system according to claim 3, wherein the first speed setting means comprises a voltage setting circuit capable of continuously varying output voltage indicating the rotational speed to be applied to the motor controller in the range of 0% to 100%.

5. The hydraulic system according to claim 3, wherein the second speed setting means comprises a transformer capable of converting a inputted flow control signal into a output voltage indicating the rotational speed to be applied to the motor controller, said output voltage is corresponding to a flow rate at which the hydraulic fluid is to flow through the speed control valve.

6. The hydraulic system according to claim 3, wherein the switching means comprises a sequential control relay provided with a relay contact that makes the first speed setting means ineffective and makes the second speed setting means effective in a charging process or an injection process in the injection molding cycle.

7. The hydraulic system according to claim 3, wherein the sequential control relay is provided further with a relay contact that makes the first and the second operating speed setting means ineffective in order to stop the pump driving motor.

8. The hydraulic system according to claim 7 further comprising a timer for preceding the start of an optional operation after the stoppage of the pump driving motor by a predetermined delay time.

* * * * *